(12) United States Patent
Holle et al.

(10) Patent No.: US 6,535,977 B1
(45) Date of Patent: Mar. 18, 2003

(54) REPLACING A UNIQUE IDENTIFIER IN A CLONED COMPUTER SYSTEM USING PROGRAM MODULE THAT RUNS ONLY ONCE DURING THE NEXT BOOT SEQUENCE

(75) Inventors: Matthew H. Holle, Kirkland, WA (US); Edward S. Miller, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/410,197

(22) Filed: Sep. 30, 1999

(51) Int. Cl.[7] ................... G06F 9/445; G06F 15/177
(52) U.S. Cl. ................................ 713/2; 717/168
(58) Field of Search ................... 717/173, 178, 717/168; 713/2, 1

(56) References Cited

U.S. PATENT DOCUMENTS 5,758,165 A * 5/1998 Shuff ............................ 713/2
5,828,834 A * 10/1998 Choi ........................... 713/202
6,108,697 A * 8/2000 Raymond et al. ........... 709/218

OTHER PUBLICATIONS

Mark Russinovich and Bryce Cogswell, "NTSID 1.1", Dec. 9, 1997.*
Mark Russinovich and Bryce Cogswell, "NewSID", May 27, 1999.*
Sean Daly, "10 Steps to Prepare to NT 5.0 Now", Windows & .NET Magazine, Feb. 1998.*
"Free Newsletter—Networking Professionals, Consultants etc", Newsgroup: comp.os.ms–windows.nt.admin.misc, Apr. 3, 1998.*
Microsoft Knowledge Base Article Q137367, "Definition of the RunOnce Keys in the Registry", Reviewed Nov. 21, 1996.*
Microsoft Knowledge Base Article Q158477, "How to Run a Program Only Once After Unattended Setup of NT 4.0", Reviewed May 22, 1997.*

* cited by examiner

Primary Examiner—Thomas Lee
Assistant Examiner—Albert Wang
(74) Attorney, Agent, or Firm—Christensen O'Connor Johnson Kindness PLLC

(57) ABSTRACT

A system and method for generating a unique identifier for a computer system is disclosed. A master computer system is prepared for duplication and configured to execute a startup program on the next boot-up sequence. The master computer system is then shut down and duplicated. On the first boot-up of the copy or "clone" computer system, a new unique identifier is created and used to replace all instances of the old unique identifier that was associated with the master computer system. Finally, a setup wizard component is executed to finish configuring the clone computer system in accordance with the customer's personal information making the system ready for commercial use.

36 Claims, 5 Drawing Sheets

REPLACING A UNIQUE IDENTIFIER IN A CLONED COMPUTER SYSTEM USING PROGRAM MODULE THAT RUNS ONLY ONCE DURING THE NEXT BOOT SEQUENCE

FIELD OF THE INVENTION

The present invention relates generally to the duplication of a computer system, and more particularly, to duplicating a computer system where each duplicate has a unique identifier.

BACKGROUND OF THE INVENTION

In the computer industry, security is becoming more and more of an important issue. Uniquely identifying individual computer systems in a network provides a strategic advantage when addressing the issue of security. Many corporate entities select their computer platform based principally on the security features provided. Windows NT is one example of a computer operating system having superior security features. At the heart of most security features is a Security IDentification code (SID) embedded within the operating system. In the Windows NT operating system, the SID is generated when the operating system is first installed. The SID uniquely identifies the computer system on which the operating system is installed and allows network accessibility to be securely administered for that computer system. Other operating systems may make use of a similar unique identifier for a similar purpose.

One disadvantage of employing a unique identifier for each computer system is that it creates a problem for manufacturers of computer systems. To compete most effectively, manufacturers must be able to mass produce the computer systems that they sell. Manufacturers are at a serious disadvantage if they must individually install an operating system on each computer system they sell. Manufacturers prefer to configure a master computer system, including an installed operating system, and then duplicate or "clone" the master computer system. Most often, the hard disk drive of the master computer system is duplicated and those duplicates are installed in other computer systems which are then sold. In this way, manufacturers can produce a large number of computer systems without having to individually install the operating system on every one. However, as noted above, unique identifiers are typically generated when the operating system is installed. If the hard disk drive from the master computer system is duplicated, the unique identifier generated when the master computer system was configured is also duplicated. In the past, this situation has made it difficult for computer system manufacturers to generate many similarly configured computer systems without having to individually install the operating system on each computer system.

Other attempts to address that problem have not provided an ideal solution. For example. one attempted solution is to deliver the computer systems with the operating system uninstalled. However, installing an operating system on a new computer is a very complex task, and most consumers dislike having to perform complex installation procedures. Moreover, the manufacturer loses some control over the installed state of the operating system if the installation is performed by the consumer rather than the manufacturer. For those reasons, this solution is undesirable.

Accordingly, a need exists for a mechanism that allows a master computer system, having a unique identifier embedded within the master computer system, to be duplicated or cloned and which provides for the generation of new unique identifiers on each clone or duplicated computer system.

SUMMARY OF THE INVENTION

The present invention addresses the above identified needs by providing a mechanism that enables a master computer system having a unique identifier to be more easily duplicated. The mechanism first prepares the master computer system for duplication. Embedded on the master computer system is a unique identifier created when the operating system was installed. Preparing the master computer system for duplication involves configuring the master computer system to execute a startup program on the next boot-up sequence. The startup program is resident on the master computer system, and may have two components, as discussed below. The master computer system is then shut down.

The master computer system may now be duplicated. For example, the hard disk drive of the master computer system may be removed and installed in a machine designed to create many identical copies of the hard disk drive. Those identical copies are then installed in other computer systems similar to the master computer system. In this manner, many computer systems may be easily created that mirror the configuration of the master computer system. For this discussion, those computer systems are termed "clones" of the master computer system.

Each of the clones may then be sold and delivered to a customer. Because the clones include copies of the master computer hard disk drive, each of the clones is also configured to execute the startup program during the first boot-up sequence. Consequently, the first time a clone computer system is powered up by the consumer, the startup program is executed.

In accordance with one aspect of the invention, the startup program includes an ID changer component. When the clone computer system is first powered up, the ID changer component executes first and very early in the boot-up sequence. The ID changer component searches a registration database contained within the operating system for the unique identifier created when the operating system was installed. It should be apparent that when the operating system was initially installed on the master computer system a unique identifier was created and stored. When the master computer system was cloned, each of the clones included the same unique identifier. Accordingly, the ID changer reads the unique identifier that already exists on the clone computer system. The ID changer also creates a new unique identifier, and then replaces the old unique identifier with the new unique identifier.

In accordance with another aspect of the invention, replacing the old unique identifier includes locating all instances of the old unique identifier stored in the registration database and replacing them with the new unique identifier.

In accordance with yet another aspect of the invention, replacing the old unique identifier also includes identifying any computer files stored on the hard disk drive that have information related to the old unique identifier, such as access permissions, and modifying that information in accordance with the new unique identifier.

In accordance with yet still other aspects of the invention, the startup program includes a setup wizard component that is executed to finish configuring the clone computer system in accordance with the customer's personal information. A wizard is an interactive utility that guides a user through a potentially complex task, typically through a series of question and answer dialog boxes. The setup wizard may be the same setup routine used to install the operating system in the first instance, but, by using a particular switch, only performs a limited subset of the installation functions, such as prompting the user for personal login information, company information, and the like.

After the setup wizard is finished, setup of the clone computer system is complete. The clone computer system reflects its own unique identifier, and the customer was spared the burden of having to perform a complete installation of the operating system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a system and method for regenerating and reapplying a unique identifier for a computer system. Briefly described, the invention allows a master computer system having a unique identifier to be more easily duplicated by providing a mechanism to regenerate a new unique identifier on each duplicate the first time each duplicate boots into the operating system having the unique identifier. The present invention may be embodied in an operating system such as the "Windows NT" operating system owned and licensed by the Microsoft Corporation of Redmond, Wash.

Figure 1:
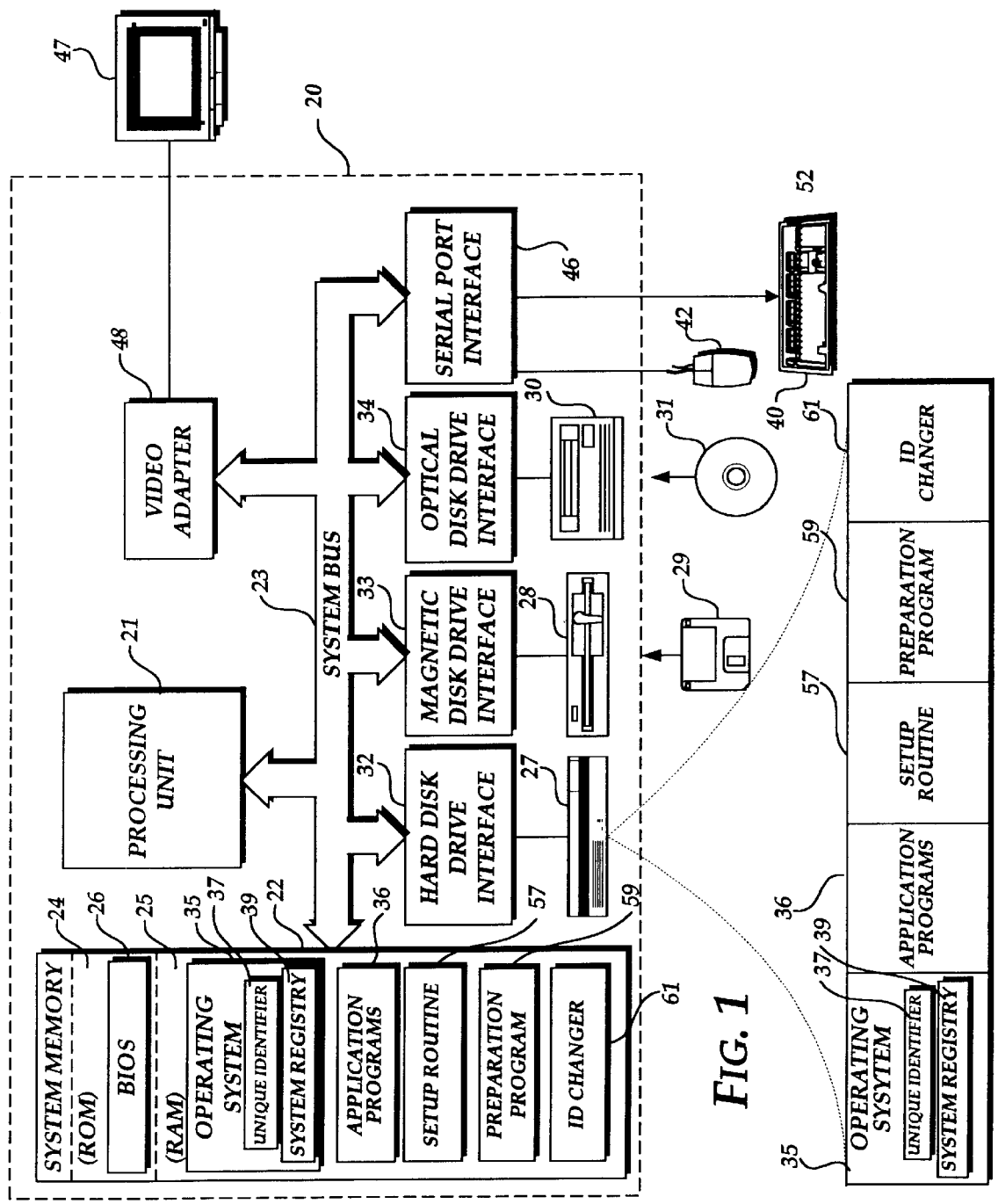
FIG. 1 a block diagram of a computer suitable for providing an exemplary operating environment for the present invention.

FIG. 1 and the following discussion are intended to provide a brief, general description of one suitable computing environment in which the invention may be implemented. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, ZIP disks, and the like, may also be used in the exemplary operating environment.

A number of program modules may be stored in the drives and RAM 25, including an operating system 35, such as an operating system embodying the present invention, one or more application programs 36, a setup routine 57, a preparation program 59, and an ID changer 61 constructed in accordance with the present invention. A unique identifier 37 that uniquely identifies the computer 20 may used by the operating system 35 to enable certain security features.

A user may enter commands and information into the personal computer 20 through input devices such as a keyboard 40 or a mouse 42. Other input devices (not shown) may include a microphone, touchpad, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

Figure 2:
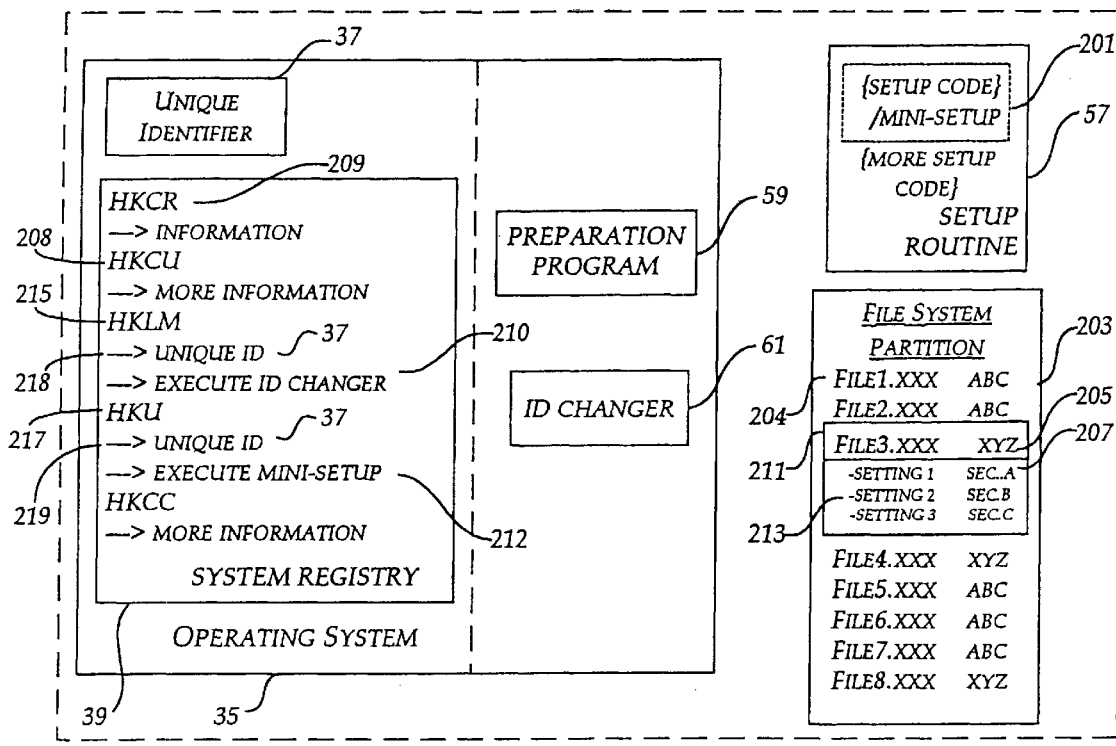
FIG. 2 is a functional block diagram of software components embodying the present invention resident on a master computer system, such as the computer of FIG. 1.

FIG. 2 is a functional block diagram illustrating several software elements that incorporate one embodiment of the present invention. The operating system 35 includes a system registry 39 and a unique identifier 37. The unique identifier 37 may have been created when the operating system 35 was first installed on the computer 20, and, among other possible uses, uniquely identifies the computer 20. The system registry 39 is a registration database containing information related to the installed states of the operating system 35 and many application programs 36 or other installed software or hardware. The system registry 39 of this embodiment has a hierarchical structure with many different registry entries, called registry keys. Each registry key has an associated registry value that stores information for later use by either the operating system 35 or other software applications. The registry keys may be grouped according to certain functionality of the computer 20. For example, registry keys associated with information that pertains only to the current user of the computer 20 may be stored in an HKey Current User (HKCU) registry key 208. The registry keys and registry key values may include instances of the unique identifier 37, such as the entries 218, 219 illustrated under the HKey Local Machine (HKLM) registry key 215 and the HKey Users registry key 217.

The system registry 39 may also contain command line entries that cause the operating system 35 to perform certain functions, like launching executable program files, at particular times. For instance, a particular registry entry, such as a "run once" registry entry, may cause the operating system 35 to launch an executable program file, identified in the associated registry value, once during the next boot sequence of the computer 20. Those skilled in the art will appreciate that executable program files may be launched at different stages during the boot sequence depending on which particular registry entry is used to launch the executable program file.

Illustrated along with the operating system 35 are two program modules which may perform functions embodying the present invention: a preparation program 59 and an ID changer 61. Although the preparation program 59 and the ID changer 61 are illustrated as a part of the operating system 35, those program modules may be independent software applications that reside elsewhere on the hard disk drive 27. The operation of the preparation program 59 and the ID changer 61 are described in detail below in connection with FIG. 4. Briefly described, the preparation program 59 is configured to prepare the computer 20 for duplication, and the ID changer 61 is configured to read the existing unique identifier 37, generate a new unique identifier, and replace every instance of the existing unique identifier 37 with the new one.

Also illustrated is a setup routine 57, which may also be known as a setup wizard. The setup routine 57 is generally used during the installation of the operating system 35 to copy the necessary program files and to perform other installation functions, such as prompting a user for personal login information, company information, or other information specific to a user. A limited subset of the installation functions of the setup routine 57 may be accessible by launching the setup routine 57 with a particular flag or parameter. The subset of the installation functions may be viewed as an abbreviated setup routine 201, also called a mini-setup routine or mini-setup wizard. The mini-setup routine 201 may be configured to bypass installing the program files, but to prompt the user for personal login information, company information, or other user-specific information. Many other configurations are possible for the mini-setup routine 201, as will be apparent to those skilled in the art.

A file system partition 203 is also shown in FIG. 2. A file system partition is a subdivision on a drive, such as a hard disk or magneto-optical disk, that can be formatted as a volume to be mounted and used by a particular operating system. The file system partition 203 may be on the hard drive 27 and may include many computer files 204. In this embodiment, the computer files 204 may have associated access permissions, such as permission 205 associated with File3.xxx 211. Those permissions regulate which users may access the computer files 204. Permissions are well known in the art. Briefly described, to determine whether a user has access to a particular computer file, the operating system 35 may verify that the permissions associated with the particular computer file allow access by the user. Each computer seeking access to the file system partition 203 is identified by the unique identifier associated with that computer, and the permissions enumerate the users that are allowed access by their unique identifiers. Likewise, if the computer file was created by the computer on which the computer file resides, the unique identifier 37 associated with that computer is embedded within the permissions of those computer files. Although the use of permissions 205 is related to computer files 204 in the preferred embodiment, such permissions 205 could be associated with any type of user accessible element stored on various forms of storage media.

Also common are computer files containing settings 213. These files, such as settings file 211, are used to keep track of user or system preferences (such as screen settings, etc.) which make up the settings 213. These settings 213 often have a security 207 associated with them to identify with which user the settings are associated. This security 207 is commonly used to secure each setting 213 so that each setting 213 can be changed only by someone with authorization. This allows a system administrator to restrict access to some of the settings 213 while allowing users access to others.

Figure 3:
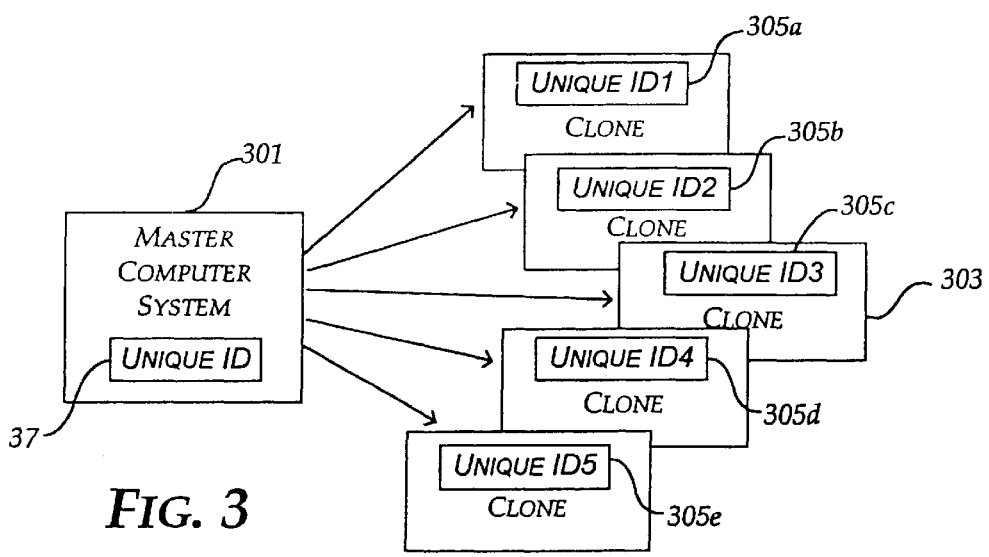
FIG. 3 is a block diagram illustrating the procedure of duplicating the master computer system illustrated in FIG. 2.
Figure 5:
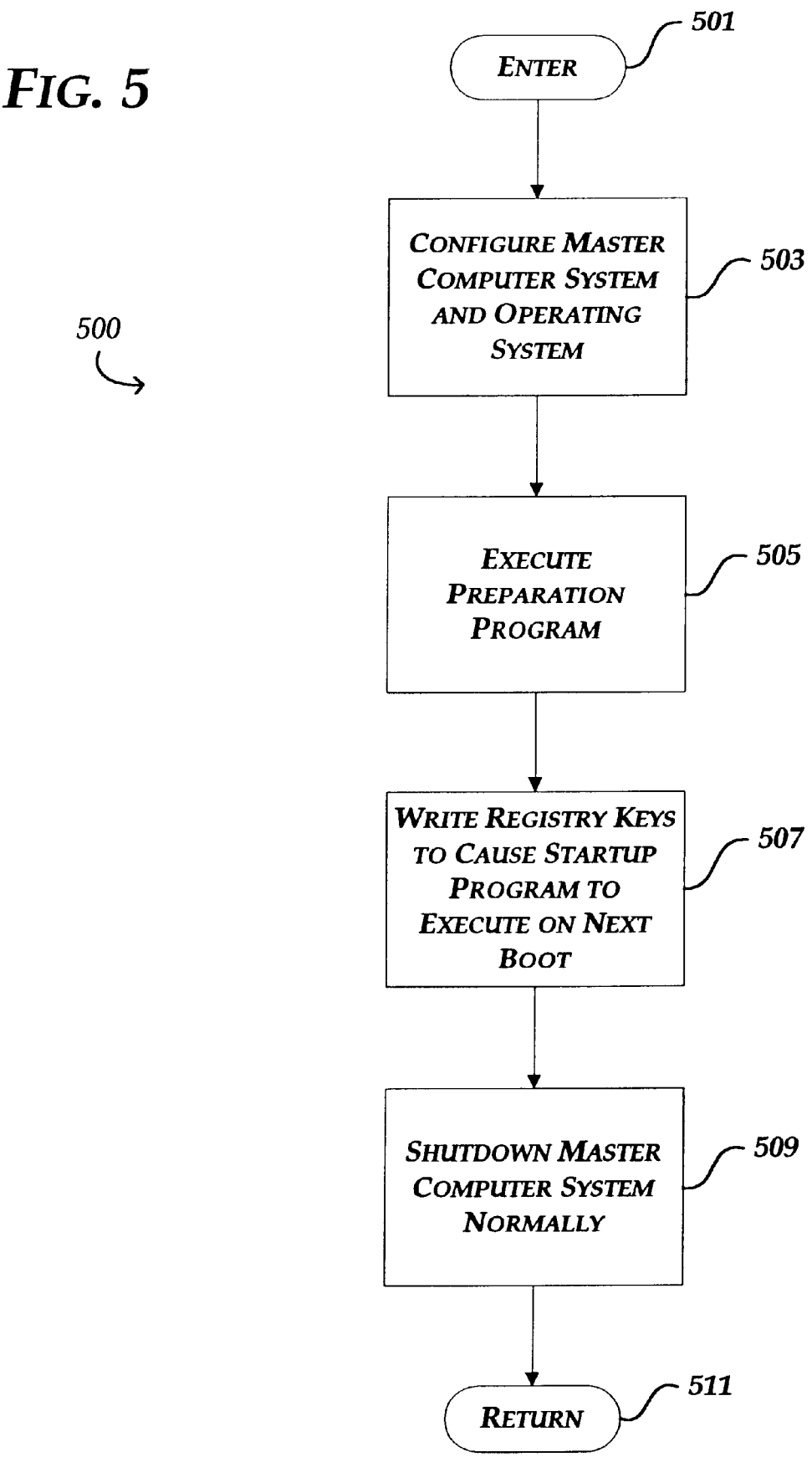
FIG. 5 is a flow chart illustrating in detail the preparing the master computer system for duplication step illustrated in FIG. 4.
Figure 6:
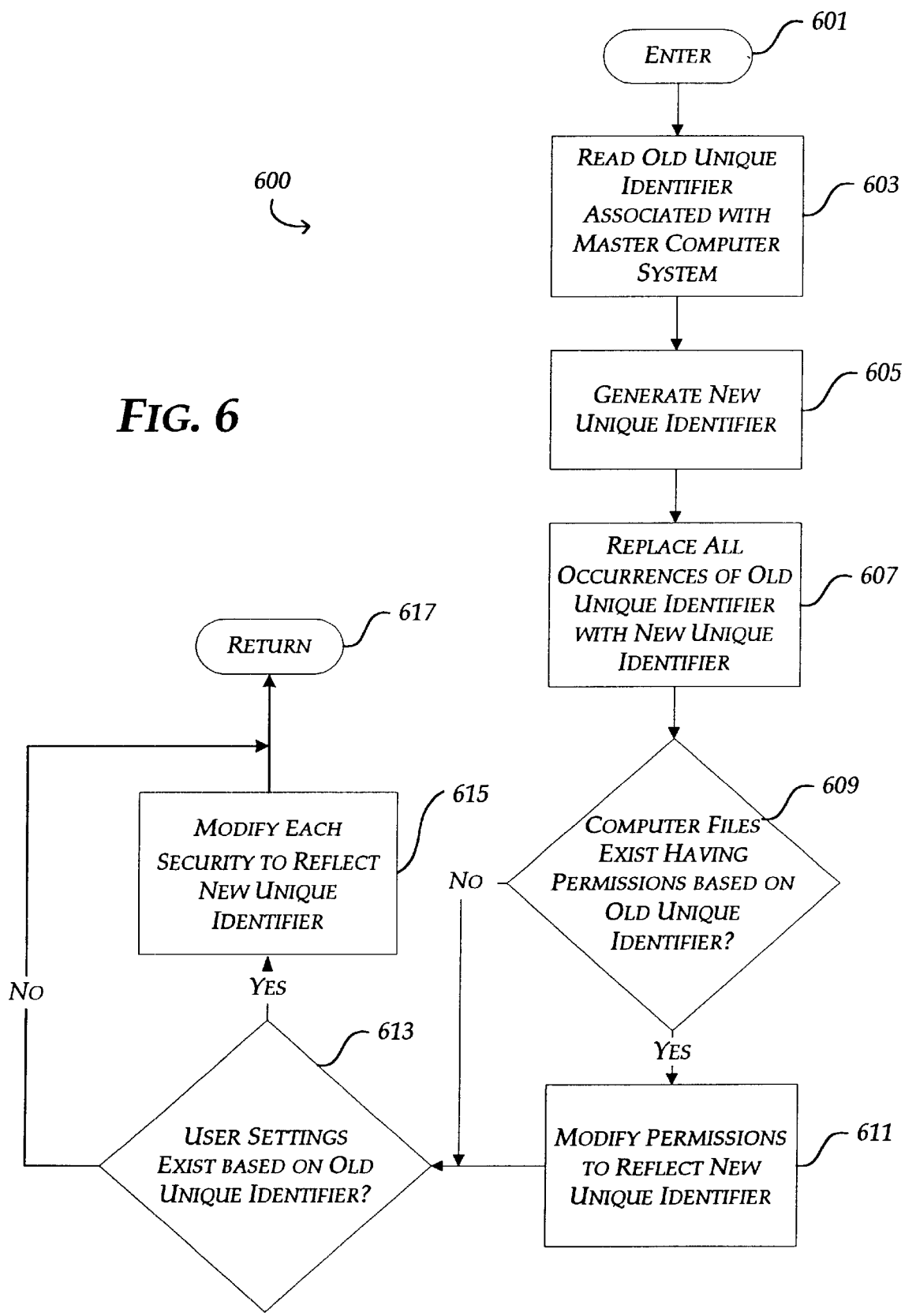
FIG. 6 is a flow chart illustrating in detail the replacing the old unique identifier with a new unique identifier step illustrated in FIG. 4.

FIG. 3 is a block diagram illustrating one duplication procedure that benefits from the present invention. In the conventional manner, a master computer system 301 is configured by a manufacturer such that the operating system 35, hardware, and any bundled software is installed and properly configured. Also resident on the master computer system 301 is the unique identifier 37. With the master computer system 301 properly configured, in accordance with the present invention, it may be duplicated to create several "clones" 303. When the clones are first created, each possesses the same unique identifier 37 as the master computer system 301. However, after the initial boot sequence of each clone 303, all instances of the unique identifier 37 are replaced by new unique identifiers 305a–e, which are themselves distinct. One process for achieving that benefit is illustrated in FIGS. 4–6, and described below.

Figure 4:
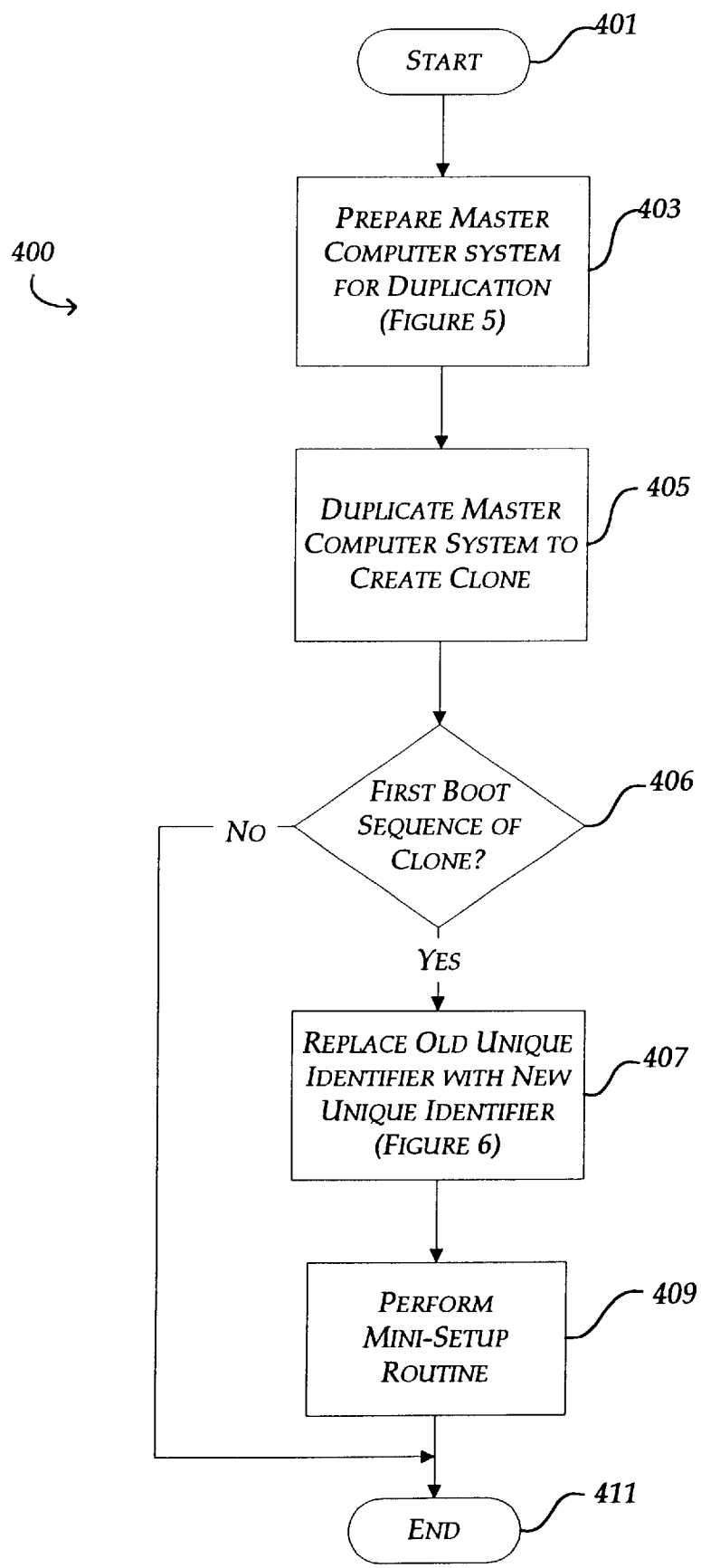
FIG. 4 is a flow chart illustrating a process for duplicating a master computer system and generating a new unique identifier on each of the duplicates.

FIG. 4 is a logical flow diagram illustrating a process for achieving the duplication procedure in FIG. 3 in accordance with one embodiment of the present invention. The process 400 begins at step 401 where a computer system manufacturer or vendor prepares to create an inventory of multiple computer systems from a master computer system. Processing continues at step 403.

At step 403, the master computer system 301 is prepared for duplication. Configuring the master computer system 301 is illustrated in FIG. 5 and discussed in detail below. Briefly described, preparing the master computer system 301 may involve installing any software, including the operating system 35, and hardware associated with the master computer system 301. The master computer system 301 is assigned a unique identifier 37 automatically during the installation of the operating system 35. Any settings or configuration switches are selected to ensure the master computer system 301 operates properly. In addition, the master computer system is configured to launch, at the next boot sequence, a startup program for changing the unique identifier 37 associated with the installed operating system 35. Once the master computer system 301 is prepared for duplication, processing proceeds to step 405.

At step 405, the master computer system 301 is duplicated to create the clones 303. The vendor or manufacturer creates a master image of the master computer system 301 by running an image copying tool, such as a hard disk duplicator, etc. The master image may then be downloaded to target computers, making the target computers clones 303 of master computer system 301. Alternatively, the hard disk drive 27 of the master computer system 301 may be removed and duplicated with a tool designed to create large numbers of duplicates of the hard disk drive 27. Each of those duplicates may then be installed in a clone computer system 303. It will be appreciated that because the clones 303 each contain duplicates of the hard disk drive 27 of the master computer system 301, each clone 303 contains the unique identifier 37 that was generated when the operating system 37 was installed on the master computer system 301. The clone 303 may then be distributed to the customers of the manufacturer. The process resumes at decision block 406.

At decision block 406, the clone 303 is powered up and a determination is made whether the clone 303 is performing its first boot sequence since the master image was copied to the clone 303. Generally, after being created, the clone 303 is powered up for the first time by the customer. If the current boot sequence is not the first boot sequence, the startup program has already been executed, so processing bypasses the startup program functions and proceeds to ending block 411, where the clone 303 boots up normally. Alternatively, a command to launch the startup program may be written to a particular registry entry or entries intended to launch application programs only once and during the next boot sequence, as will be understood by those skilled in the art. If the current boot sequence is the first boot sequence, processing proceeds to step 407.

At step 407, during the initial boot sequence, the clone 303 replaces the old unique identifier 37 with a new unique identifier 305c. The functions performed during the initial power up are described in detail below, and illustrated in the logical flow diagram of FIG. 6. Briefly described, the old unique identifier 37 copied from the master computer system 301 is replaced by a new unique identifier 305c that uniquely identifies the clone 303. After the old unique identifier 37 is replaced, processing continues at step 409.

At step 409, a mini-setup routine 201 is performed. As mentioned above, the mini-setup routine 201 is a subset of the functions performed by the setup routine 57. In this embodiment, the mini-setup routine 201 gathers user information such as user personal login information and company information. The mini-setup routine 201 may also present user agreements, such as end-user license agreements, and set up individual computer settings, such as regional settings and network configuration, among other functions. By using the mini-setup routine 201, the amount of time required to setup the clone 303 after it is first turned on has been reduced. Once the clone computer system 303 has finished the mini-setup routine 201, processing proceeds to step 411 where the process terminates and the clone 303 can now be used for normal computing.

FIG. 5 is a functional flow diagram illustrating in more detail the preparation for duplication of the master computer system 301 that occurs at step 403 of FIG. 4. To begin, the process 500 enters at step 501, where the master computer system 301 has been acquired and the manufacturer begins configuring it for duplication. Processing continues at step 503.

At step 503, the master computer system 301 and the operating system 35 are configured. Configuring the master computer system 301 and the operating system 35 involves installing any hardware associated with the master computer system 301, and installing the operating system 35. It should again be noted that the unique identifier 37 is created during the installation of the operating system 35. Installing the operating system 35 may involve setting up the desktop, security, and network portions of the system. Configuring the master computer system 301 may also involve the installation of custom applications, running of audit tests, setting of workgroup options, and other configuration procedures. Once the master computer system 301 and operating system 35 are installed and configured, processing continues at step 505.

At step 505, the preparation program 59 is executed to prepare the master computer system 301 for duplication. The preparation program 59 can be stored on the hard drive 27 or other computer readable medium. The preparation program 59 may initially ensure that the user is an administrator or someone authorized to duplicate the master computer system 301. The preparation program 59 then begins to perform a number of tasks to prepare the system for duplication. For example, some preliminary tasks may include removing the "most recently used" documents and network connections from the system cache, inserting a tag to indicate when the preparation program 59 was run on the system, increasing the system's registry quota, and changing the boot timeout, among others. Once these preliminary tasks are performed, processing continues at step 507.

At step 507, entries are written in the system registry 39 to cause a startup program to execute during the system's next boot-up sequence. Those entries may be written by the preparation program 59, or through manual programming procedures. As mentioned above, the startup program may include two portions: an ID changer 61 and a mini-setup routine 201. Consequently, two entries in the system registry 39 may be used to separately launch each of the two portions of the startup program. For example, one entry 210 may be added to launch the ID changer 61 very early in the boot sequence, such as prior to mounting disk volumes or loading drivers for certain hardware components. Another entry 212 may be added to launch the mini-setup wizard 201 much later during the boot sequence.

Moreover, the ID changer 61 of this embodiment may be designed to execute in the native language of the operating system 35, which allows the ID changer 61 to interface with the application programming interface (API) that directly accesses functionality of the operating system 35. This aspect improves over a system that may require invoking a separate set of APIs, such as the Win32 API overlay to the Windows NT operating system. In this manner, the ID changer 61 of the present embodiment is capable of executing much earlier in the boot process than another software routine that must interface with the Win32 API. It should be appreciated that the selection of the particular registry key for the entry 210 should provide for launching the ID generator 61 outside any unnecessary API layers, as those skilled in the art will appreciate. Once the command line is inserted into the registry key 209, processing proceeds at step 509.

At step 509, the master computer system 301 is shut down normally. In this manner, the master computer system 301 is configured to execute the startup program during the next power up, which will occur after the master computer system 301 has been cloned. Processing then returns from step 511 to step 405 of the flow chart illustrated in FIG. 4 and described above.

FIG. 6 is a logical flow diagram illustrating in detail the process (briefly described above at block 407) of replacing an old unique identifier 37 with a new unique identifier 37 during the first boot sequence of each clone 303. The process 600 begins at step 601, where a clone 303 is powered up for the first time. It should be noted that because the clone 303 includes a duplicate of the hard disk drive 27 of the master computer system 301, the clone 303 is configured to launch the startup program (including the ID changer 61 and the mini-setup routine 201) during the first boot sequence. Processing begins at step 603.

At step 603, the first boot sequence begins and the ID changer 61 is launched. As mentioned, the ID changer 61 is launched early in the boot process, and accordingly is able to execute efficiently and quickly. The ID changer 61 reads the old unique identifier 37 from the system registry 39 of the clone 303. As mentioned, the old unique identifier 37 was generated when the master computer system 301 was configured. Although the unique identifier 37 is stored in the system registry 39 of the operating system 35 in the preferred embodiment, the unique identifier 37 can be stored and read from any computer readable medium of the computer system. Processing continues at step 605.

At step 605, a new unique identifier 305c is generated. If the new unique identifier 305c is a SID as described above, the same algorithm used to generate the old unique identifier 37 may be used to generate the new unique identifier 305c. In the Windows NT operating system described above, the SID is a 96-bit pseudo-random code. The new unique identifier 305c could be of any type however, as long as it uniquely identified the clone 303 from the master computer system 301 and other computer systems. Once the new unique identifier 305c is generated, processing continues at step 607.

At step 607, all occurrences of the old unique identifier 37 in the system registry 39 are replaced with the new unique identifier 305c. The ID changer 61 searches the entire registry 39 for instances of the old unique identifier 37 stored in registry keys or registry key values. Any instances found are changed to the new unique identifier 305c. For example, registry key 217 (FIG. 2) contains an entry 219 that reflects the old unique identifier 37. When the ID changer 61 encounters that entry 219, the old unique identifier 37 is replaced with the new unique identifier 305c. Once all occurrences of the old unique identifier 37 are replaced, processing proceeds to decision block 609.

At decision block 609, the ID changer 61 determines whether computer files 204 exist that have permissions 205 based on the old unique identifier 37. If the operating system 35 is the Windows NT operating system, the attached hard disks may be scanned for an NT File System (NTFS) partition. The file system partition 203 is then scanned and each computer file 204 is checked for permissions 205 based on the old unique identifier 37. If no permissions 205 based upon the old unique identifier 37 are found, processing proceeds to decision block 613. If permissions 205 are found that are based on the old unique identifier 37, processing continues to step 611.

At step 611, the ID changer 61 modifies any permissions 205 based on the old unique identifier 37 to reflect the new unique identifier 305c. This allows permissions 205 associated with a particular user to migrate transparently as the unique identifier is changed. Once any affected permissions 205 are modified to reflect the new unique identifier 37, processing proceeds to decision block 613.

At decision block 613, the ID changer 61 searches for the presence of any per-user configuration settings 213 that may be based on the old unique identifier 37. For instance, settings 213, located in a settings file 211, may have an associated security 207 (FIG. 2). The security 207 may be based on the old unique identifier 37. If the ID changer 61 detects the security 207, processing continues to step 615. However, if the ID changer 61 does not detect any user settings having a security based on the old unique identifier 37, processing proceeds to step 617.

At step 615, the ID changer 61 opens the settings file 211 and resets the security 207 on each setting 213 that reflects the old unique identifier 37. In that way, when the user next logs in, and the setting 213 is pulled from the settings file 211, the security 207 associated with the setting 213 matches the new unique identifier 305c. Otherwise, any settings generated for installed software may be unavailable to the user after the old unique identifier 37 is changed to the new unique identifier 305c. Once the ID changer 61 resets securities for any settings in a settings file, processing continues to step 617 where the process returns to step 407 of FIG. 4.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-readable medium having computer-executable instructions for replacing an old unique identifier with a new unique identifier, which, when executed, comprise:
    (a) preparing a computer system to execute a program module only during the next initialization of the computer system's operating system; and
    (b) in response to the execution of the program module:
        (i) reading the old unique identifier;
        (ii) generating a new unique identifier; and
        (iii) replacing all occurrences of the old unique identifier with the new unique identifier.

2. The computer-readable medium of claim 1, wherein preparing a computer system to execute a program module further comprises:
    configuring the computer system;
    writing an instruction in a storage location that executes during the initialization of the computer system's operating system; and
    shutting down the computer system.

3. The computer-readable medium of claim 2, wherein writing the instruction is performed by a preparation program.

4. The computer-readable medium of claim 1, wherein the program module includes an ID changer.

5. The computer-readable medium of claim 4, wherein the program module further includes a mini-setup routine.

6. The computer-readable medium of claim 5, wherein the mini-setup routine is a subset of the functions of a setup routine generally used in setting up a computer system.

7. The computer-readable medium of claim 1, wherein the program module includes a mini-setup routine.

8. The computer-readable medium of claim 7, wherein the mini-setup routine is a subset of the functions of a setup routine generally used in setting up a computer system.

9. The computer-readable medium of claim 1, wherein reading the old unique identifier includes:
    accessing a system registry that stores the old unique identifier; and
    retrieving from the system registry the old unique identifier.

10. The computer-readable medium of claim 1, wherein each unique identifier is a 96-bit pseudo-random security identification code.

11. The computer-readable medium of claim 10, wherein the new unique identifier is generated using the same algorithm used to generate the old unique identifier.

12. The computer-readable medium of claim 1, wherein replacing all occurrences of the old unique identifier with the new unique identifier includes:

searching for all instances of the old unique identifier; and replacing each instance of the old unique identifier with the new unique identifier.

13. The computer-readable medium of claim 12, wherein the instances of the old unique identifier are stored in a system registry.

14. The computer-readable medium of claim 13, wherein the old unique identifier is stored as part of a registry key value.

15. The computer-readable medium of claim 13, wherein the old unique identifier is stored in a registry key.

16. The computer-readable medium of claim 1, wherein replacing all occurrences of the old unique identifier with the new unique identifier includes:

searching for a computer file stored on the computer system and that reflects the old unique identifier; and modifying the computer file to reflect the new unique identifier.

17. The computer-readable medium of claim 16, wherein the computer file that reflects the old unique identifier includes a permission based on the old unique identifier.

18. The computer-readable medium of claim 17, wherein replacing all occurrences of the old unique identifier with the new unique identifier includes:

searching for the permission based on the old unique identifier; and modifying the permission to reflect the new unique identifier.

19. The computer-readable medium of claim 16, wherein the computer file that reflects the old unique identifier includes a setting based on the old unique identifier.

20. The computer-readable medium of claim 19, wherein replacing all occurrences of the old unique identifier with the new unique identifier includes:

searching for settings which reflect the old unique identifier; and modifying those settings to reflect the new unique identifier.

21. The computer-readable medium of claim 1, wherein the program module is configured to interface directly with an application programming interface native to the computer system's operating system.

22. A method for preparing a master computer system for duplication, comprising:

(a) setting an entry associated with an operating system of the master computer system to launch a program module only during the next initialization of the operating system, the program module having computer-executable instructions, which, when executed, comprise:

(i) reading an old unique identifier associated with the master computer system;

(ii) generating a new unique identifier;

(iii) replacing all occurrences of the old unique identifier with the new unique identifier; and (iv) if a computer file accessible by the program module exists that reflect the old unique identifier, modifying the computer file to reflect the new unique identifier; and (b) duplicating the operating system of the master computer system for installation in a second computer system.

23. The method of claim 22, wherein the entry associated with the operating system is a system registry key within a system registry associated with the operating system.

24. The method of claim 22, wherein the program module includes an ID changer.

25. The method of claim 24, wherein the program module also includes a mini-setup routine.

26. The method of claim 25, wherein the mini-setup routine comprises computer-executable instructions, which, when executed, perform a subset of functions associated with a general setup routine for setting up the master computer system.

27. The method of claim 22, wherein the startup program comprises a mini-setup routine comprising computer-executable instructions, which, when executed, perform a subset of functions associated with a general setup routine for setting up the master computer system.

28. The method of claim 22, wherein reading the old unique identifier includes:

accessing a system registry key that stores the old unique identifier; and retrieving from the system registry key the old identifier.

29. The method of claim 22, wherein each unique identifier is a 96-bit pseudo-random security identification code.

30. The method of claim 22, wherein replacing all occurrences of the old unique identifier with the new unique identifier includes:

searching for all instances of the old unique identifier in a system registry; and replacing each instance of the old unique identifier with the new unique identifier.

31. The method of claim 30, wherein the old unique identifier is stored as part of a registry key value.

32. The method of claim 30, wherein the old unique identifier is stored in a registry key.

33. The method of claim 22, wherein the computer files that reflect the old unique identifier include a permission that reflects the old unique identifier.

34. The method of claim 33, wherein replacing all occurrences of the old unique identifier with the new unique identifier includes:

searching for permissions which reflect the old unique identifier; and modifying those permissions to reflect the new unique identifier.

35. The method of claim 22, wherein the computer files that reflect the old unique identifier includes a security having the old unique identifier embedded.

36. The method of claim 35, wherein replacing all occurrences of the old unique identifier with the new unique identifier includes:

searching for securities which reflect the old unique identifier; and modifying those securities to reflect the new unique identifier.

* * * * *

UNITED STATES PATENT AND TRADEMARK OFFICE
CERTIFICATE OF CORRECTION

PATENT NO.   : 6,535,977 B1
DATED        : March 18, 2003
INVENTOR(S)  : M.H. Holle et al.

It is certified that error appears in the above-identified patent and that said Letters Patent is hereby corrected as shown below:

Title page,
Item [56], References Cited, OTHER PUBLICATIONS, " "10 Steps to Prepare to NT 5.0 Now"," should read -- "10 Steps to Prepare for NT 5.0 Now", --
Item [57], ABSTRACT,
Line 11, "customer's personal information" should read -- customer's personal information, --

Column 1,
Line 57, "For example." should read -- For example, --

Column 2,
Line 6, "above identified" should read -- above-identified --
Line 44, "master computer system a unique" should read -- master computer system, a unique --

Column 8,
Line 13, "computer readable" should read -- computer-readable --

Column 9,
Line 18, "computer readable" should read -- computer-readable --
Line 27, "type however," should read -- type, however, --

Column 11,
Line 65, "exists that reflect" should read -- exists that reflects --

Column 12,
Line 54, "identifier includes" should read -- identifier include --

Signed and Sealed this

Seventh Day of October, 2003

JAMES E. ROGAN
*Director of the United States Patent and Trademark Office*